(No Model.)
H. SCHLÜTER.
Velocipede.
No. 231,622.  Patented Aug. 24, 1880.
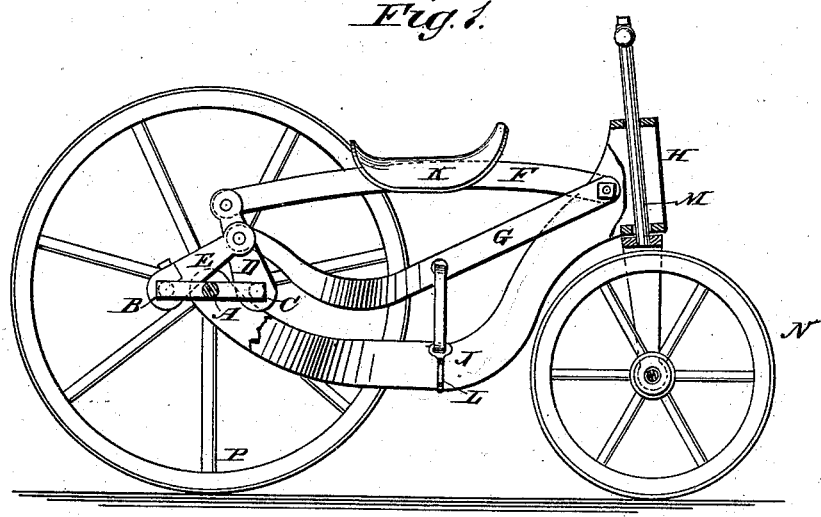
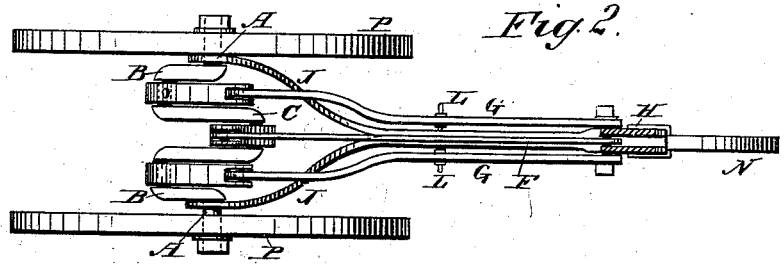
WITNESSES:
Francis McArdle.
C. Sedgwick
INVENTOR:
H. Schlüter
BY Munn & Co
ATTORNEYS.

UNITED STATES PATENT OFFICE.

HENRY SCHLÜTER, OF STAPLETON, NEW YORK.

VELOCIPEDE.

SPECIFICATION forming part of Letters Patent No. 231,622, dated August 24, 1880.

Application filed June 18, 1880. (No model.)

*To all whom it may concern:*

Be it known that I, HENRY SCHLÜTER, of Stapleton, in the county of Richmond and State of New York, have invented a new and Improved Velocipede, of which the following is a specification.

The object of the invention is to connect the saddle and stirrup-levers of a velocipede with the cranks of axle in such a manner that the dead-point shall be avoided, as hereinafter described.

In the accompanying drawings, Figure 1 is a cross-sectional elevation of my improved velocipede. Fig. 2 is a plan view of the same.

Similar letters of reference indicate corresponding parts.

The axle or shaft A of the velocipede is provided with the cranks B B and C, of the same length, and projecting in directly opposite directions, which cranks are connected, by means of the connecting-rods D and E, with the levers F and G, pivoted in the forward part, H, of the frame J of the velocipede.

In the case shown there are three cranks, two projecting in the same direction, with the third between them; but, although I prefer this arrangement, I do not limit myself thereto, but may use two or more cranks, which, however, must be arranged so that the corresponding cranks are connected with and acted upon by corresponding levers. In the case shown the seat K rests upon and is attached to the lever F, whereas stirrups L L, or other suitable foot-rests, are suspended from or attached to the levers G G. The rod M, connected with the steering-wheel N, passes through the part H of the velocipede-frame.

The device operates as follows: The operator occupies the seat K and passes his feet in the stirrups L L. If the levers F and G are in the position shown in Fig. 1, the entire weight of the body rests upon the lever F, which causes the rear end of said lever to descend, thereby rotating the wheels P half-way around, which brings the levers G G and crank B B into the position just occupied by the lever F and crank C. If the operator now rises in the stirrups L L—that is, presses the stirrups downward—the entire weight of the body rests upon the levers G G, the rear ends of which are depressed, thereby rotating the wheels half-way around in the manner they were rotated by the lever F.

The special advantage of the within-described arrangement is that if one crank or pair of cranks is on the dead-center the other crank or pair of cranks is beyond the said dead-center, and it only requires a pressure upon the seat or stirrups to rotate the wheels.

I am aware that it is not new to use the weight alternately on levers which in turn move the axle half-way round; but this is done in connection with a hand-lever for relieving the dead-point.

What I claim as new is—

In a velocipede, the saddle and stirrup-levers connected with the axle-cranks by rods D E, arranged to bring the cranks in a horizontal plane and at an acute angle to said rods at the end of each half-revolution, as shown and described, whereby the dead-point is avoided.

HENRY SCHLÜTER.

Witnesses:
OSCAR I. GUNZ,
C. SEDGWICK.